United States Patent
Sasano et al.

(10) Patent No.: US 10,383,309 B2
(45) Date of Patent: *Aug. 20, 2019

(54) EXCREMENT HIDING ABSORBENT SHEET FOR PETS

(71) Applicant: Unicharm Corporation, Ehime (JP)

(72) Inventors: Yasuhiro Sasano, Kagawa (JP); Yumei Takahashi, Kagawa (JP)

(73) Assignee: Unicharm Corporation, Ehime (JP)

( * ) Notice: Subject to any disclaimer, the term of this patent is extended or adjusted under 35 U.S.C. 154(b) by 668 days.

This patent is subject to a terminal disclaimer.

(21) Appl. No.: 14/652,236

(22) PCT Filed: Nov. 15, 2013

(86) PCT No.: PCT/JP2013/080952
§ 371 (c)(1),
(2) Date: Jun. 15, 2015

(87) PCT Pub. No.: WO2014/091872
PCT Pub. Date: Jun. 19, 2014

(65) Prior Publication Data
US 2015/0320009 A1    Nov. 12, 2015

(30) Foreign Application Priority Data
Dec. 13, 2012 (JP) .................. 2012-272364

(51) Int. Cl.
*A01K 1/01* (2006.01)
*A01K 1/015* (2006.01)

(52) U.S. Cl.
CPC .......... *A01K 1/0157* (2013.01); *A01K 1/0107* (2013.01)

(58) Field of Classification Search
CPC ........ A01K 1/01; A01K 1/015; A01K 1/0107; A01K 1/0157
See application file for complete search history.

(56) References Cited

U.S. PATENT DOCUMENTS 3,626,899 A * 12/1971 Spellman ............... A01K 15/02
                                                                119/169
5,630,376 A *  5/1997 Ochi ....................... A01K 1/0107
                                                                119/169

(Continued)

FOREIGN PATENT DOCUMENTS

| JP | 2008-136377 A | 6/2008 |
| JP | 2012-130285 A | 7/2012 |
| JP | 2012-130286 A | 7/2012 |

OTHER PUBLICATIONS

European extended Search Report from corresponding European application No. 13862183.4 dated Jun. 15, 2015 (4 pgs).

(Continued)

*Primary Examiner* — Monica L Williams
*Assistant Examiner* — Michael A. Fabula
(74) *Attorney, Agent, or Firm* — Osha Liang LLP

(57) ABSTRACT

An absorbent sheet for pets that is highly effective in concealing pet excrement. The absorbent sheet includes: a liquid-permeable front-surface sheet; a liquid-impermeable back-surface sheet; an absorbent body that is provided between the front-surface sheet and the back-surface sheet, and that absorbs liquid that has permeated through the front-surface sheet; an intermediate sheet that is arranged between the front-surface sheet and the absorbent body; and a color arrangement region that forms a color arrangement pattern together with at least one of the front-surface sheet, the back-surface sheet, and the absorbent body. The front-surface sheet is formed so as to have a lower total light transmittance than the intermediate sheet.

12 Claims, 11 Drawing Sheets

(56) References Cited

U.S. PATENT DOCUMENTS

| | | | | |
|---|---|---|---|---|
| 6,244,216 B1* | 6/2001 | Ochi | A01K 1/0107 119/169 |
| 7,493,870 B2* | 2/2009 | Takahashi | A01K 1/0107 119/171 |
| 7,891,320 B2* | 2/2011 | Otsuji | A01K 1/0152 119/169 |
| 8,042,490 B2* | 10/2011 | Takahashi | A01K 1/0157 119/169 |
| 8,468,973 B2* | 6/2013 | Sasano | A01K 1/0107 119/169 |
| 8,578,888 B2* | 11/2013 | Komatsubara | A01K 1/0107 119/171 |
| 9,532,547 B2* | 1/2017 | Takahashi | A01K 1/0107 |
| 2004/0255869 A1* | 12/2004 | Matsuo | A01K 1/0107 119/170 |
| 2005/0166855 A1* | 8/2005 | Kaneko | A01K 1/0107 119/169 |
| 2005/0166856 A1* | 8/2005 | Kaneko | A01K 1/0107 119/169 |
| 2008/0236504 A1* | 10/2008 | Silverman | A01K 1/0107 119/169 |
| 2009/0000557 A1* | 1/2009 | Takahashi | A01K 1/0107 119/161 |
| 2009/0000561 A1* | 1/2009 | Takahashi | A01K 1/0107 119/171 |
| 2009/0048571 A1* | 2/2009 | Catalan | A61L 15/22 604/367 |
| 2011/0146581 A1* | 6/2011 | Sasano | A01K 1/0107 119/171 |
| 2013/0206076 A1* | 8/2013 | Komatsubara | A01K 1/0107 119/171 |
| 2014/0158060 A1* | 6/2014 | Martin | A01K 1/0107 119/169 |
| 2015/0027380 A1* | 1/2015 | Sasano | A01K 1/0107 119/161 |

OTHER PUBLICATIONS

International Search Report from corresponding PCT application No. PCT/JP2013/080952 dated Jun. 16, 2015 (4 pgs).

Australian Office Action from corresponding Australian application No. 2013 358 393 dated Dec. 6, 2016 (4 pgs).

International Search Report from corresponding PCT application No. PCT/JP2013/080952 dated Jan. 28, 2014 (4 pgs).

* cited by examiner

FIG. 17

| type | Sheet 1 through-air nonwoven fabric | Sheet 2 through-air nonwoven fabric | Sheet 3 through-air nonwoven fabric | Sheet 4 SMS nonwoven fabric | Sheet 5 tissue paper |
|---|---|---|---|---|---|
| basis weight | 25g/m² | 23g/m² | 20g/m² | 8g/m² | 15g/m² |
| | measurement results of the total light transmittance (%) | | | | |
| 1 | 66.09 | 69.27 | 67.97 | 85.82 | 46.4 |
| 2 | 64.92 | 66.15 | 66.95 | 85.78 | 46.3 |
| 3 | 67.78 | 68.13 | 72 | 83.63 | 43.85 |
| 4 | 65.37 | 68.2 | 71 | 83.89 | 46.64 |
| 5 | 68.68 | 65.74 | 69.52 | 86.72 | 45.73 |
| 6 | 65.16 | 66.78 | 66.88 | 88.29 | 45.16 |
| 7 | 62.22 | 65.81 | 68.13 | 86.74 | 43.39 |
| 8 | 67.03 | 63.5 | 68.39 | 85.56 | 45.69 |
| 9 | 64.1 | 68.15 | 68.53 | 85 | 45.86 |
| 10 | 62.83 | 64.07 | 67.81 | 85.16 | 46.21 |
| average | 65.42 | 66.58 | 68.72 | 85.66 | 45.52 |
| maximum | 68.68 | 69.27 | 72.00 | 88.29 | 46.64 |
| minimum | 62.22 | 63.5 | 66.88 | 83.63 | 43.39 |

FIG. 18

|  | number of samples | Elapse of 10 seconds | Elapse of 1 minute | Elapse of 2 minutes | Elapse of 5 minutes |
|---|---|---|---|---|---|
| Example | 1 | 8 | 5 | 3 | 2 |
|  | 2 | 10 | 4 | 3 | 2 |
|  | 3 | 10 | 6 | 3 | 2 |
|  | 4 | 10 | 6 | 3 | 2 |
|  | 5 | 10 | 5 | 4 | 3 |
|  | average | 9.6 | 5.2 | 3.2 | 2.2 |
| Comparative Example | 1 | 10 | 8 | 5 | 3 |
|  | 2 | 10 | 7 | 4 | 3 |
|  | 3 | 10 | 7 | 7 | 4 |
|  | 4 | 10 | 9 | 5 | 3 |
|  | 5 | 10 | 7 | 5 | 4 |
|  | average | 10 | 7.6 | 5.2 | 3.4 |

EXCREMENT HIDING ABSORBENT SHEET FOR PETS

RELATED APPLICATIONS

This application is a 35 U.S.C. § 371 national phase filing of International Patent Application No. PCT/JP2013/080952, filed Nov. 15, 2013, through which and to which priority is claimed under 35 U.S.C. § 119 to Japanese Patent Application No. 2012-272364, filed Dec. 13, 2012, the entire disclosure of which is hereby expressly incorporated by reference.

TECHNICAL FIELD

The present invention relates to an absorbent sheet for pets, more particularly to an absorbent sheet for pets which has excellent concealability for excrement.

BACKGROUND ART

Conventionally, absorbent sheets for pets have been provided to be used particularly for disposing excrement of pets which are kept indoors. For example, Japanese Unexamined Patent Application Publication JP 2012-130285A discloses an absorbent sheet for pets.

In the absorbent sheet according to this prior art, an intermediate sheet is disposed between a liquid-permeable top sheet and an absorber. Further, a colored sheet containing a black component is disposed between the intermediate sheet and the absorber.

The top sheet is light transmissive. The intermediate sheet has an L* value larger than the black component of the colored sheet, can retain liquid, and has a lower light transmittance than the top sheet.

By provision of such a structure, when a pet excretes urine on the prior art absorbent sheet, part of urine is retained by the intermediate sheet. Further, with the structure in which the colored sheet is disposed on the back surface side of the intermediate sheet and the light transmissive top sheet is disposed on the top surface side of the intermediate sheet, a user can easily recognize an outline of urine retained in the intermediate sheet, from the top sheet side.

Depending on a desired absorbent sheet for pets, however, it may be desired to make the outline of excreted urine less visible from the top sheet.

PRIOR ART DOCUMENT

Patent Document

Patent Document 1:
JP 2012-130285 A

SUMMARY OF THE INVENTION

Problem to be Solved by the Invention

Accordingly, it is an object of the present invention to provide an absorbent sheet for pets which has excellent concealability for excrement.

Means for Solving the Problem

In order to solve the above-described problem, according to a preferred aspect of the present invention, an absorbent sheet for pets is provided which includes an excretion surface on which a pet excretes, a placing surface that is opposite to the excretion surface, a liquid-permeable top sheet that is disposed on the excretion surface side, a liquid-impermeable back sheet that is disposed on the placing surface side, an absorber that is disposed between the top sheet and the back sheet and absorbs liquid which has penetrated the top sheet, a core layer that is provided in the absorber and has a core layer top surface formed on a side of the core layer facing the excretion surface, a core layer back surface formed on a side of the core layer facing the placing surface, and a core layer side surface between the core layer top surface and the core layer back surface, a covering sheet that covers at least part of the core layer top surface, and an intermediate sheet that is disposed between the top sheet and the absorber. Further, the absorbent sheet for pets has a coloration region that is visible from the excretion surface side and forms a coloration pattern together with other regions of the absorbent sheet, and the top sheet is formed to have a lower total light transmittance than the intermediate sheet.

According to a further aspect of the absorbent sheet of the present invention, difference in total light transmittance between the top sheet and the intermediate sheet is 1 to 50%.

According to a further aspect of the absorbent sheet of the present invention, the total light transmittance of the top sheet is 40 to 80%.

According to a further aspect of the absorbent sheet of the present invention, the total light transmittance of the intermediate sheet is 60 to 90%.

According to a further aspect of the absorbent sheet of the present invention, the top sheet has a plurality of ridges and grooves that are each formed between adjacent ones of the ridges.

According to a further aspect of the absorbent sheet of the present invention, the intermediate sheet is formed of a composite nonwoven fabric having a meltblown nonwoven fabric layer between two spun-bond nonwoven fabric layers and having a basis weight of 8 to 25 g/m$^2$.

According to a further aspect of the absorbent sheet of the present invention, the coloration region has an L* value of 50 or less in an L*a*b* color system, wherein "L" represents lightness and "a" and "b" represent green-red and blue-yellow color components respectively.

According to a further aspect of the absorbent sheet of the present invention, the coloration region has an L* value larger than 0 but smaller than 100 and a b* value larger than −0.4a in an L*a*b* color system.

According to a further aspect of the absorbent sheet of the present invention, the coloration region is formed in the covering sheet.

According to a further aspect of the absorbent sheet of the present invention, the covering sheet includes a first covering sheet that covers at least part of the core layer top surface and a second covering sheet that covers at least part of the core layer back surface, and the coloration region is formed in the first covering sheet.

According to a further aspect of the absorbent sheet of the present invention, the covering sheet is formed by a third covering sheet that covers the core layer back surface and the coloration region is formed in the third covering sheet.

According to a further aspect of the absorbent sheet of the present invention, a plurality of the intermediate sheets are provided.

According to a further aspect of the absorbent sheet of the present invention, the coloration region is formed in the intermediate sheet.

According to a further aspect of the absorbent sheet of the present invention, the coloration region is formed in the top sheet.

According to a further aspect of the absorbent sheet of the present invention, the coloration region is formed in the core layer.

Effect of the Invention

According to the present invention, an absorbent sheet for pets can be provided which has high concealability for pet excrement.

BRIEF DESCRIPTION OF THE DRAWINGS

FIG. 17 is data showing measurement results of the total light transmittance of a sheet of Example.

FIG. 18 is data showing measurement results of a test for evaluating the excrement concealing effect of the Example.

BEST MODES FOR CARRYING OUT THE INVENTION

First Embodiment

A first embodiment of an absorbent sheet for pets according to the present invention is now explained with reference to FIGS. 1 to 3. The "pet" in this embodiment widely includes vertebrates (mammals, reptiles, birds and amphibians) and invertebrates, and typically represents pets such as cats, dogs, rabbits and hamsters.

The pet absorbent sheet 100 is a flat sheet having a prescribed thickness. The pet absorbent sheet 100 has a pet use mode in which it is spread out flat with a back sheet 160 placed on an intended place and receives excrement of pets. The pet absorbent sheet according to this embodiment preferably has a rectangular or square shape, but it may have a circular, elliptical or polygonal shape. The "excrement of pets" as used herein widely includes not only urine, but body fluids such as saliva and menstrual blood. In the pet use mode, a top sheet 100 has a planar structure serving both as a flat excrement receiving surface (hereinafter also referred to as a main absorbing region) for receiving excrement of pets in non-contact with pets and as a pet walking surface on which the pet can walk. The manner of placing the pet absorbent sheet on the "intended place" includes a manner of directly placing the pet absorbent sheet on floor or the like, and a manner of setting the pet absorbent sheet on a holder and placing it on floor or the like.

Figure 1:
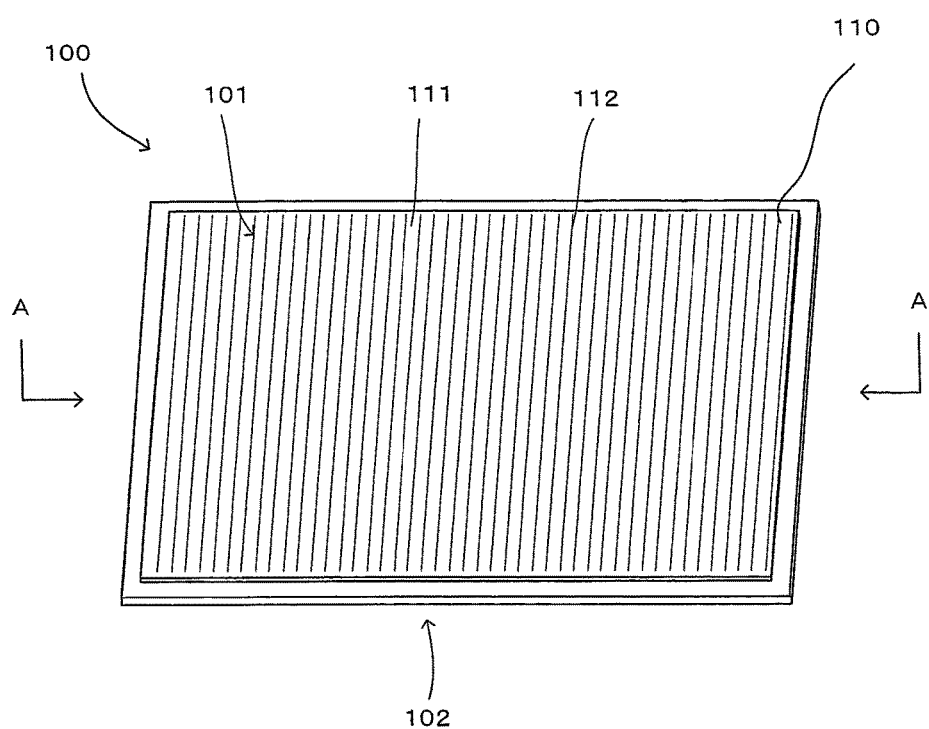
FIG. 1 is a perspective view showing an absorbent sheet for pets according to a first embodiment of the present invention.

FIG. 1 is a perspective view showing the overall structure of the pet absorbent sheet 100 according to the first embodiment of the present invention. FIG. 2 schematically shows the sectional structure of the pet absorbent sheet 100 in a sectional view taken along line A-A in FIG. 1.

The pet absorbent sheet 100 has an excretion surface 101 on which a pet excretes in the pet use mode and a placing surface 102 which comes in contact with the intended place. The placing surface 102 is opposite to the excretion surface 101.

The excretion surface 101 is an example embodiment that corresponds to the "excretion surface on which a pet excretes" according to the present invention.

The placing surface 102 is an example embodiment that corresponds to the "placing surface opposite to the excretion surface" according to the present invention.

The pet absorbent sheet 100 has a liquid-permeable top sheet 110 which is disposed on the excretion surface 101 side. The top sheet 110 is an example embodiment that corresponds to the "liquid-permeable top sheet which is disposed on the excretion surface side" according to the present invention.

Further, the pet absorbent sheet 100 has a liquid-impermeable back sheet 160 which is disposed on the placing surface 102 side. The back sheet 160 is an example embodiment that corresponds to the "liquid-impermeable back sheet which is disposed on (a side of) the placing surface" according to the present invention.

The pet absorbent sheet 100 further has an absorber 140 that is disposed between the top sheet 110 and the back sheet 160 and absorbs liquid which has penetrated the top sheet 110. The absorber 140 is an example embodiment that corresponds to the "absorber that is disposed between the top sheet and the back sheet and absorbs liquid which has penetrated the top sheet" according to the present invention.

The pet absorbent sheet 100 further has an intermediate sheet 120 that is disposed between the top sheet 110 and the absorber 140. The intermediate sheet 120 is an example embodiment that corresponds to the "intermediate sheet that is disposed between the top sheet and the absorber" according to the present invention.

The pet absorbent sheet 100 further has a coloration region 130 that is visible from the excretion surface 101 side and forms a coloration pattern together with other regions of the pet absorbent sheet 100.

The coloration region 130 is an example embodiment that corresponds to the "coloration region that is visible from the excretion surface side and forms a coloration pattern together with other regions of the absorbent sheet" according to the present invention.

Further, the "coloration pattern" in the present invention does not only refer to color. For example, it is a concept including lightness and brightness. Specifically, the condition that "the coloration pattern is different" in the present invention is only necessary to make a user recognize a difference in coloration.

Figure 2:
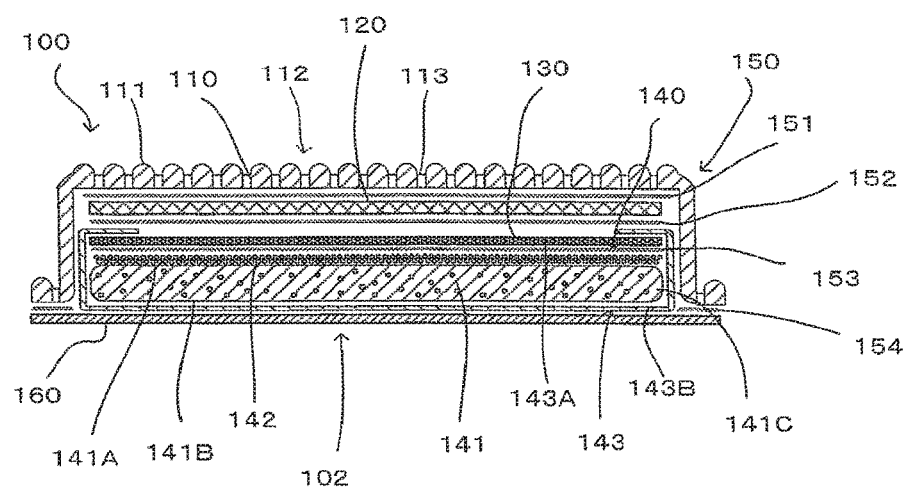
FIG. 2 is a sectional view taken along line A-A in FIG. 1.
Figure 3:
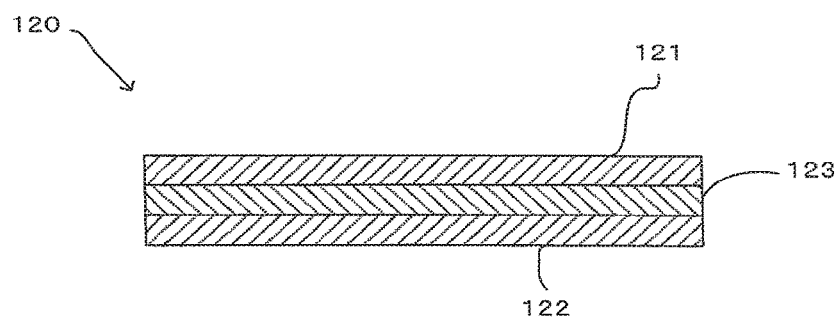
FIG. 3 is an explanatory drawing of an intermediate sheet.

At this time, for example in a sectional view as shown in FIG. 2, the coloration pattern only needs to be formed by a part having the coloration region 130 and other parts.

Further, the specific structure of the coloration region 130 will be described below.

The top sheet 110 and the back sheet 160 are formed to be slightly larger than the absorber 140. Peripheral edges of the top sheet 110 and the back sheet 160 are bonded together at an edge end bonding part 154, with the intermediate sheet 120, the coloration region 130 and the absorber 140 disposed between the top sheet 110 and the back sheet 160.

The top sheet 110 may be formed of thermoplastic nonwoven fabric, including a spun-bond nonwoven fabric of thermoplastic long fibers, a through-air nonwoven fabric of thermoplastic short fibers, a point-bond nonwoven fabric and a perforated film.

Particularly as the top sheet 110 according to the present invention, a through-air nonwoven fabric is used.

The top sheet 110 has ridges 111, grooves 112 which are each formed between adjacent ones of the ridges 111, and openings 113 which are formed at intervals and extend along the grooves 112.

The ridges 111 and the grooves 112 which are formed on the top sheet 110 are example embodiments that correspond to the feature that "the top sheet has a plurality of ridges and grooves each formed between adjacent ones of the ridges" according to the present invention.

The ridges 111 and the grooves 112 of the top sheet form a surface layer of the excretion surface 101, or a part of the pet absorbent sheet which is closest to the user when the user visually checks the absorbent sheet. Thus, when the user visually checks the pet absorbent sheet 100, the ridges 111 and the grooves 112 of the top sheet 110 are first strongly recognized by the user. As a result, especially an outline of liquid excrement can be prevented from being easily recognized.

The top sheet 110 is configured to have a lower total light transmittance than the intermediate sheet 120. This is an example embodiment that corresponds to the feature that "the top sheet is formed to have a lower total light transmittance than the intermediate sheet" according to the present invention.

Reduction of the total light transmittance of the top sheet 110 is realized by increasing the thickness of the top sheet 110, increasing the amount of titanium oxide to be added to the synthetic fibers for forming the top sheet 110, or increasing the fiber density of the top sheet 110.

Difference in total light transmittance between the top sheet 110 and the intermediate sheet 120 is preferably 1 to 50%. This is an example embodiment that corresponds to the "difference in total light transmittance between the top sheet and the intermediate sheet is 1 to 50%" according to the present invention.

Further, the total light transmittance of the top sheet 110 is preferably 40 to 80%. This is an example embodiment that corresponds to the "total light transmittance of the top sheet is preferably 40 to 80%" according to the present invention.

The intermediate sheet 120 may be formed of thermoplastic nonwoven fabric, including a through-air nonwoven fabric, a point-bond nonwoven fabric or spun-bond nonwoven fabric.

Particularly as the intermediate sheet 120 according to the present invention, preferably, a composite nonwoven fabric having a meltblown nonwoven fabric layer 123 between a first spun-bond nonwoven fabric layer 121 and a second spun-bond nonwoven fabric layer 122 is used. The composite nonwoven fabric may be referred to as SMS (spunbond/meltblown/spunbond) nonwoven fabric. It is preferable that the SMS nonwoven fabric to be used for the intermediate sheet 120 has a basis weight of 8 to 25 g/m$^2$.

The intermediate sheet 120 is an example embodiment that corresponds to the "intermediate sheet that comprises a composite nonwoven fabric having a meltblown nonwoven fabric layer between two spun-bond nonwoven fabric layers and having a basis weight of 8 to 25 g/m$^2$" according to the present invention.

The SMS nonwoven fabric forming the intermediate sheet 120 has a higher fiber density than the top sheet 110 and thus has excellent liquid suction ability by capillary action. Therefore, the intermediate sheet 120 can quickly suck liquid excrement from the top sheet 110.

As a result, the amount of liquid excrement remaining in the top sheet 110 can be reduced.

Therefore, it can be made hard to visually recognize the liquid excrement from the excretion surface 101 of the top sheet 110.

The total light transmittance of the intermediate sheet 120 is higher than that of the top sheet 110.

Under this condition, the total light transmittance of the intermediate sheet 120 is set to 60 to 90%. This is an example embodiment that corresponds to the feature that "the total light transmittance of the intermediate sheet is 60 to 90%" according to the present invention.

Increase of the total light transmittance of the intermediate sheet 120 can be realized by reducing the thickness of the intermediate sheet 120, reducing the amount of titanium oxide to be added to the synthetic fibers for forming the intermediate sheet 120, or reducing the fiber density of the intermediate sheet 120.

The absorber 140 of the pet absorbent sheet 100 has a core layer 141 and a super absorbent polymer layer 142 that is disposed on a top of the core layer 141. The core layer 141 is an example embodiment that corresponds to the "core layer provided in the absorber" according to the present invention.

The core layer 141 has a core layer top surface 141A that is formed on a side facing the excretion surface 101 of the pet absorbent sheet 100, a core layer back surface 141B that is formed on a side facing the placing surface 102 of the pet absorbent sheet 100, and a core layer side surface 141C that is formed between the core layer top surface 141A and the core layer back surface 141B.

The core layer top surface 141A, the core layer back surface 141B and the core layer side surface 141C are example embodiments that correspond to the "core layer top surface formed on a side of the core layer facing the excretion surface, a core layer back surface formed on a side of the core layer facing the placing surface, and a core layer side surface formed between the core layer top surface and the core layer back surface", respectively, according to the present invention.

A laminate including the core layer 141 and the super absorbent polymer layer 142 is covered by a covering sheet 143. The covering sheet 143 is an example embodiment that corresponds to the "covering sheet that covers at least part of the core layer top surface" according to the present invention.

In the first embodiment, the covering sheet 143 has a first covering sheet 143A that covers a top of the core layer top surface 141A. The first covering sheet 143A is an example embodiment that corresponds to the "first covering sheet that covers at least part of the core layer top surface" according to the present invention.

The covering sheet 143 further has a second covering sheet 143B that covers the core layer back surface 141B, the core layer side surface 141C and part of the core layer top surface 141A. The second covering sheet 143B is an example embodiment that corresponds to the "second covering sheet that covers at least part of the core layer back surface" according to the present invention.

Further, a portion of the second covering sheet 143B which covers part of the core layer top surface 141A is disposed on an excretion surface side of the first covering sheet 143A disposed on the core layer top surface 141A.

The core layer 141 may be formed of a mixture of particulate or fibrous super absorbent polymer and fluff pulp, or a mixture of particulate or fibrous super absorbent polymer, fluff pulp and thermoplastic synthetic fibers.

The super absorbent polymer layer 142 is formed by dispersing super absorbent polymer on the top of the core layer 141.

The covering sheet 143, or the first covering sheet 143A and the second covering sheet 143B are formed of tissue paper and provided to prevent deformation of the super absorbent polymer layer 142 and the core layer 141.

In the first embodiment, the covering sheet 143 is colored and forms the coloration region 130. This is an example embodiment that corresponds to the feature that "the coloration region is formed in the covering sheet" according to the present invention.

Specifically, the first covering sheet 143A of the covering sheet 143 is colored. This is an example embodiment that corresponds to the feature that "the coloration region is formed in the first covering sheet" according to the present invention.

In the first embodiment, the top sheet 110 and the intermediate sheet 120 has a white color. Having a white color here means that a dye or a pigment is not added, or that a white dye or a white pigment is added.

On the other hand, the coloration region 130 is colored with black-, yellow-, orange- and/or red-based color. In this invention, the black-based color is defined as having an L* value of 50 or less in an L*a*b* color system. This is an example embodiment that corresponds to the feature that "the coloration region has an L* value of 50 or less in an L*a*b* color system" according to the present invention.

Further, in the present invention, yellow-, orange- and red-based colors are collectively defined as having an L* value larger than 0 but smaller than 100 and a b* value larger than −0.4a in the L*a*b* color system. This is an example embodiment that corresponds to the feature that "the coloration region has an L* value larger than 0 but smaller than 100 and a b* value larger than −0.4a in an L*a*b* color system" according to the present invention.

A black-based color absorbs the coloration pattern colored by liquid excrement and thereby makes the excrement inconspicuous.

Further, yellow-, orange- and red-based colors assimilate with the coloration pattern colored by liquid excrement and thereby make the excrement inconspicuous.

The back sheet 160 may be preferably formed particularly of a resin film sheet in order to reliably secure its liquid-impermeability. For example, a film of polyethylene, polypropylene or polyethylene terephthalate may be used to form the back sheet 160. Further, in consideration of flexibility, the back sheet may also be formed of a nonwoven fabric to which a water repellent is applied.

A bonding part 150 is provided to bond the top sheet 110 and the intermediate sheet 120, the intermediate sheet 120 and the first covering sheet 143A, the first covering sheet 143A and the super absorbent polymer layer 142, and the top sheet 110 and the back sheet 160.

The bonding part 150 includes a surface layer side bonding part 151 for bonding the top sheet 110 and the intermediate sheet 120, an intermediate bonding part 152 for bonding the intermediate sheet 120 and the first covering sheet 143A, an absorber side bonding part 153 for bonding the first covering sheet 143A and the super absorbent polymer layer 142, and an edge end bonding part 154 for bonding the top sheet 110 and the back sheet 160.

A hot-melt adhesive is used in the surface layer side bonding part 151, the intermediate bonding part 152 and the edge end bonding part 154. The hot-melt adhesive is also referred to as HMA (Hot Melting Adhesive).

The hot-melt adhesive can be applied to the surface layer side bonding part 151, the intermediate bonding part 152 and the edge end bonding part 154 in a spiral or linear pattern.

Further, the surface layer side bonding part 151 and the intermediate bonding part 152 are preferably subjected to curtain spray coating. In the curtain spray coating, the hot-melt adhesive is discharged in the form of fine fibers and uniformly applied.

In the curtain spray coating, an adhesive coating of 0.1 to 1.0 g/m$^2$ is particularly preferable. Under this condition, when the top sheet 110, the intermediate sheet 120 and the absorber 140 absorb excrement, the intermediate sheet 120 and the absorber 140 are separated from each other by deformation due to expansion.

The edge end bonding part 154 is preferably subjected to bead coating because the top sheet 110 and the back sheet 160 must be firmly bonded together.

In the bead coating, the hot-melt adhesive is linearly applied in non-contact with the bonding part along a machine direction in the manufacturing process. Therefore, the hot-melt adhesive is applied in a fine line, so that a small amount of hot-melt adhesive can be provided with a high basis weight.

In the absorber side bonding part 153, the first covering sheet 143A and the super absorbent polymer layer 142 are bonded together by water spray. In the water spray, water is sprayed over the super absorbent polymer layer 142 to bond the first covering sheet 143A thereto in the manufacturing process, so that deformation of the absorber can be prevented. After sprayed, the water evaporates. Thus, the water sprayed part of the pet absorbent sheet 100 is dry in user's actual use of the pet absorbent sheet 100.

In the pet absorbent sheet 100 according to the first embodiment of the present invention, when a pet excretes, the excrement is led from the top sheet 110 into the absorber 140 via the intermediate sheet 120. At this time, the excrement can be satisfactorily transferred to the absorber 140 through the intermediate sheet 120 having low liquid retainability. Further, the top sheet 110 has a lower total light transmittance than the intermediate sheet 120, so that the excrement retained in the intermediate sheet 120 and the absorber 140 is made less visible from the top sheet 100.

The first covering sheet 143A forming the coloration region 130 can conceal the excrement retained in the intermediate sheet 120 and the absorber 140.

Therefore, the excrement retained in the intermediate sheet 120 and the absorber 140 is made less visible from the top sheet 100.

Further, the intermediate bonding part 152 that bonds the intermediate sheet 120 and the first covering sheet 143A collapses, and the intermediate sheet 120 and the absorber 140 are separated from each other.

As a result, the excrement retained in the intermediate sheet 120 and the absorber 140 is further made less visible from the top sheet 100.

Second Embodiment

Figure 4:
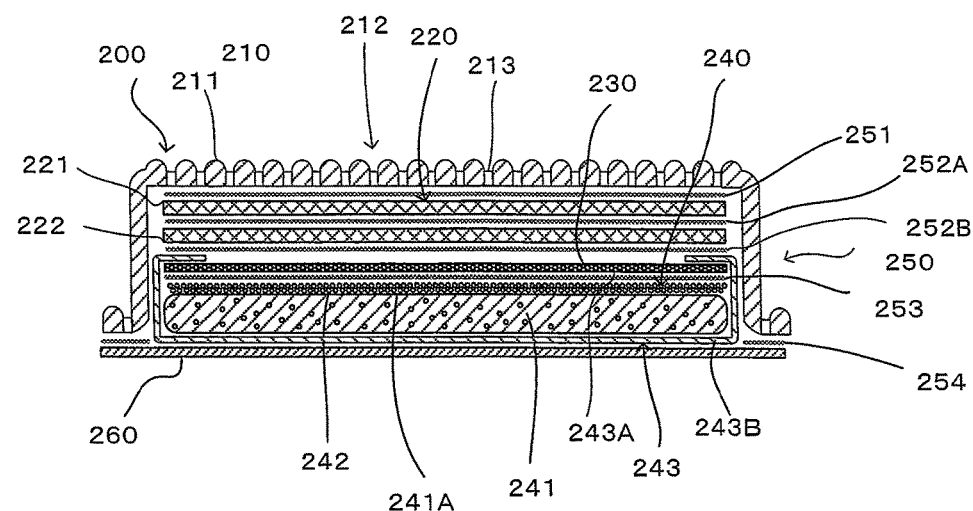
FIG. 4 is a sectional view showing an absorbent sheet for pets according to a second embodiment of the present invention.

A second embodiment according to the present invention is explained with reference to FIG. 4. In a pet absorbent sheet 200 according to the second embodiment, an absorber 240 is disposed between a top sheet 210 and a back sheet 260, and an intermediate sheet 220 is disposed between the top sheet 210 and the absorber 240.

The top sheet 210 has the same structure as the top sheet 100 of the first embodiment. Specifically, the top sheet 210 is formed of a through-air nonwoven fabric, having ridges 211, grooves 212 which are each formed between adjacent ones of the ridges 211 and openings 213 which are formed at intervals and extend along the grooves 212.

The back sheet 260 has the same structure as the back sheet 160 of the first embodiment.

The absorber 240 has the same structure as the absorber 140 of the first embodiment. Specifically, a core layer 241 and a super absorbent polymer layer 242 which is disposed on a top of the core layer 241 are covered by a first covering sheet 243A and a second covering sheet 243B.

Further, a portion of the second covering sheet 243B which covers part of a core layer top surface 241A is disposed on an excretion surface side of the first covering sheet 243A disposed on the core layer top surface 241A.

The first covering sheet 243A is colored and forms a coloration region 230.

In the second embodiment, the intermediate sheet 220 includes a first intermediate sheet 221 and a second intermediate sheet 222. In this manner, a plurality of sheets can be used as the intermediate sheet 220. Further, the first intermediate sheet 221 and the second intermediate sheet 222 are bonded by the first intermediate bonding part 252A, and the second intermediate sheet 222 and the absorber 240 are bonded by the second intermediate bonding part 252B.

Like the intermediate bonding part 152 of the above-described first embodiment, the second intermediate bonding part 252B can be separated by liquid absorption.

Further, in the second embodiment, the two intermediate sheets 220 are used, but three or more intermediate sheets may be used. This is an example embodiment that corresponds to the feature that "a plurality of the intermediate sheets are provided" according to the present invention.

A surface layer side bonding part 251 has the same structure as the surface layer side bonding part 151 of the first embodiment.

An absorber side bonding part 253 has the same structure as the absorber side bonding part 153 of the first embodiment.

An edge end bonding part 254 has the same structure as the edge end bonding part 154 of the first embodiment.

The pet absorbent sheet 200 according to the second embodiment essentially has the same effect as the pet absorbent sheet 100 of the first embodiment.

In this embodiment, however, by providing the first intermediate sheet 221 and the second intermediate sheet 222 as the intermediate sheet 220, higher concealability for excrement is provided compared with the first embodiment.

Further, the first intermediate sheet 221 can be provided to have higher fiber density than the top sheet 210, and the second intermediate sheet 222 can be provided to have higher basis weight than the first intermediate sheet 221.

Specifically, density gradient can be provided among the top sheet 210, the first intermediate sheet 221 and the second intermediate sheet 222. As a result, liquid can be more easily drawn into the absorber 240, so that the excrement concealing effect (concealability) can be enhanced.

Third Embodiment

Figure 5:
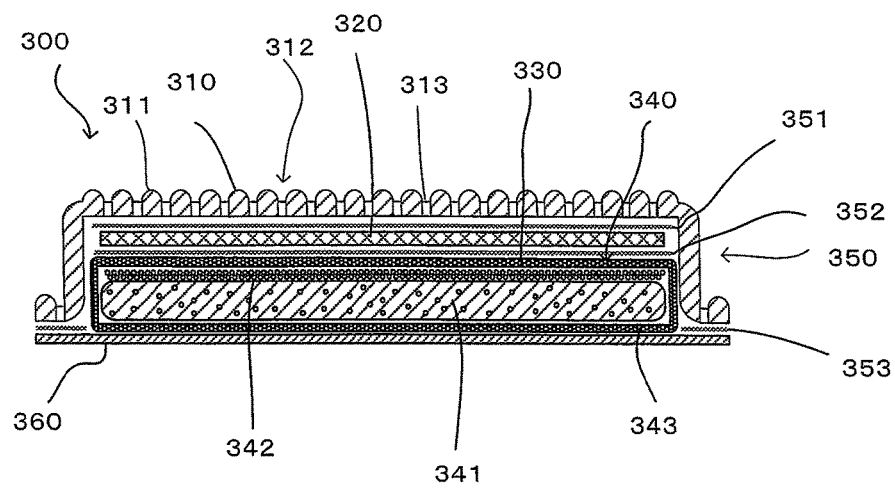
FIG. 5 is a sectional view showing an absorbent sheet for pets according to a third embodiment of the present invention.

A third embodiment according to the present invention is explained with reference to FIG. 5. In a pet absorbent sheet 300 according to the third embodiment, an absorber 340 is disposed between a top sheet 310 and a back sheet 360. Further, an intermediate sheet 320 is disposed between the top sheet 310 and the absorber 340.

The top sheet 310 has the same structure as the top sheet 110 of the first embodiment. Specifically, the top sheet 310 is formed of a through-air nonwoven fabric, having ridges 311, grooves 312 which are each formed between adjacent ones of the ridges 311 and openings 313 which are formed at intervals and extend along the grooves 312.

The back sheet 360 has the same structure as the back sheet 160 of the first embodiment.

In the absorber 340, a core layer 341 and a super absorbent polymer layer 342 which is disposed on a top of the core layer 341 are covered by a covering sheet. The covering sheet is formed of a single sheet and referred to as a third covering sheet 343.

The covering sheet 343 is formed of colored tissue and forms a coloration region 330. Thus, the coloration region 330 is also formed on the side of a placing surface 300B of the pet absorbent sheet 300.

This is an example embodiment that corresponds to the feature that "the covering sheet comprises a third covering sheet that covers the core layer back surface" according to the present invention.

The intermediate sheet 320 has the same structure as the intermediate sheet 120 of the first embodiment.

A surface layer side bonding part 351 has the same structure as the surface layer side bonding part 151 of the first embodiment.

An intermediate bonding part 352 has the same structure as the intermediate bonding part 152 of the first embodiment.

An absorber side bonding part 353 has the same structure as the absorber side bonding part 153 of the first embodiment.

An edge end bonding part 354 has the same structure as the edge end bonding part 154 of the first embodiment.

The pet absorbent sheet 300 according to the third embodiment has the same effect as the pet absorbent sheet 100 of the first embodiment in terms of concealability for excrement as viewed from the excretion surface.

Further, the coloration region 330 is also provided on the placing surface. Generally, when disposed of after use, a pet absorbent sheet is folded with the excretion surface inside. Accordingly, the placing surface is exposed.

Therefore, in the pet absorbent sheet 300 according to the third embodiment, the excrement can be made less visible from the placing surface side, so that user's discomfort can be reduced when the absorbent sheet is disposed of after use.

Fourth Embodiment

Figure 6:
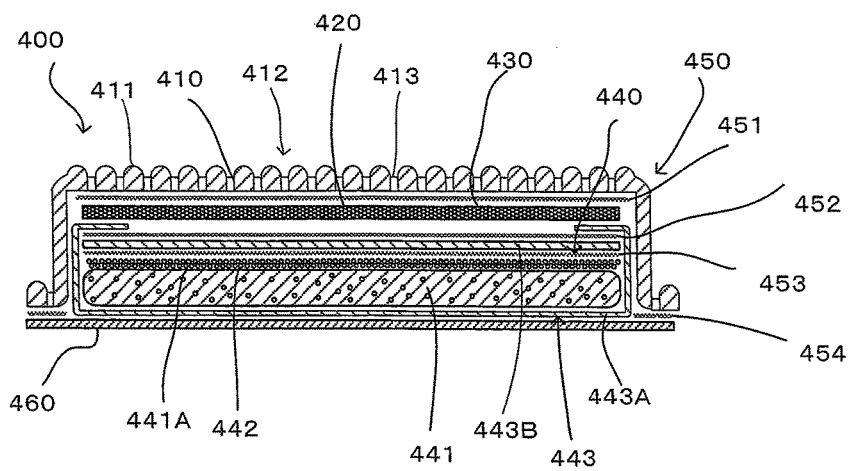
FIG. 6 is a sectional view showing an absorbent sheet for pets according to a fourth embodiment of the present invention.

A fourth embodiment according to the present invention is explained with reference to FIG. 6.

In a pet absorbent sheet 400 according to the fourth embodiment, an absorber 440 is disposed between a top sheet 410 and a back sheet 460. Further, an intermediate sheet 420 is disposed between the top sheet 410 and the absorber 440.

The top sheet 410 has the same structure as the top sheet 110 of the first embodiment. Specifically, the top sheet 410 is formed of a through-air nonwoven fabric, having ridges 411, grooves 412 which are each formed between adjacent ones of the ridges 411 and openings 413 which are formed at intervals and extend along the grooves 412.

The back sheet 460 has the same structure as the back sheet 160 of the first embodiment.

In the absorber 440, a core layer 441 and a super absorbent polymer layer 442 which is disposed on a top of the core layer 441 are covered by a first covering sheet 443A and a second covering sheet 443B.

Further, a portion of the second covering sheet 443B which covers part of a core layer top surface 441A is disposed on an excretion surface side of the first covering sheet 443A disposed on the core layer top surface 441A.

The first covering sheet 443A and the second covering sheet 443B are formed of uncolored white tissue.

The intermediate sheet 420 is formed of SMS nonwoven fabric like the intermediate sheet 120 of the first embodiment, but the intermediate sheet 420 is colored and forms a coloration region 430.

This is an example embodiment that corresponds to the feature that "the coloration region is formed in the intermediate sheet" according to the present invention.

A surface layer side bonding part 451 has the same structure as the surface layer side bonding part 151 of the first embodiment.

An intermediate bonding part 452 has the same structure as the intermediate bonding part 152 of the first embodiment.

An absorber side bonding part 453 has the same structure as the absorber side bonding part 153 of the first embodiment.

An edge end bonding part 454 has the same structure as the edge end bonding part 154 of the first embodiment.

The pet absorbent sheet 400 according to the fourth embodiment has the same effect as the pet absorbent sheet 100 of the first embodiment.

Fifth Embodiment

Figure 7:
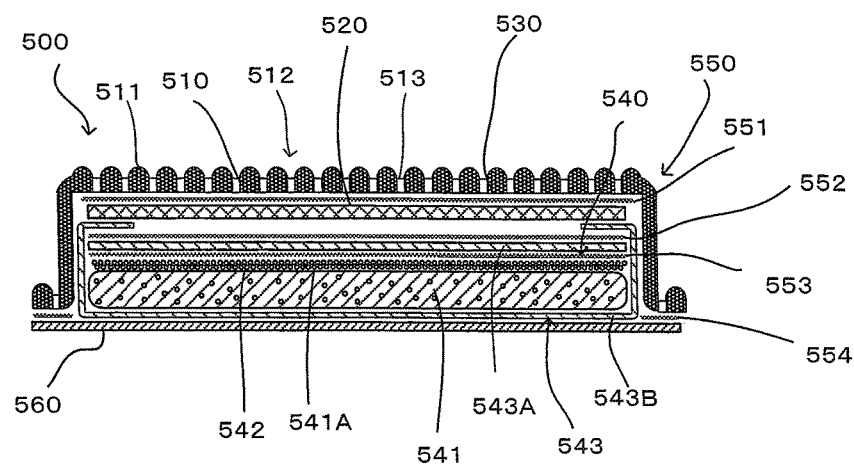
FIG. 7 is a sectional view showing an absorbent sheet for pets according to a fifth embodiment of the present invention.

A fifth embodiment according to the present invention is explained with reference to FIG. 7. In a pet absorbent sheet 500 according to the fifth embodiment, an absorber 540 is disposed between a top sheer 510 and a back sheet 560. Further, an intermediate sheet 520 is disposed between the top sheet 510 and the absorber 540.

The top sheet 510 is formed of a through-air nonwoven fabric, having ridges 511, grooves 512 which are each formed between adjacent ones of the ridges 511, and openings 513 which are formed at intervals and extend along the grooves 512.

The top sheet 510 is colored and forms a coloration region 530. This is an example embodiment that corresponds to the feature that "the coloration region is formed in the top sheet" according to the present invention.

The back sheet 560 has the same structure as the back sheet 160 of the first embodiment.

In the absorber 540, a core layer 541 and a super absorbent polymer layer 542 which is disposed on a top of the core layer 541 are covered by a first covering sheet 543A and a second covering sheet 543B.

Further, a portion of the second covering sheet 543B which covers part of a core layer top surface 541A is disposed on an excretion surface side of the first covering sheet 543A disposed on the core layer top surface 541A.

The first covering sheet 543A and the second covering sheet 543B are formed of uncolored white tissue.

The intermediate sheet 520 has the same structure as the intermediate sheet 120 of the first embodiment.

A surface layer side bonding part 551 has the same structure as the surface layer side bonding part 151 of the first embodiment.

An intermediate bonding part 552 has the same structure as the intermediate bonding part 152 of the first embodiment.

An absorber side bonding part 553 has the same structure as the absorber side bonding part 153 of the first embodiment.

An edge end bonding part 554 has the same structure as the edge end bonding part 154 of the first embodiment.

The pet absorbent sheet 500 according to the fifth embodiment has the same effect as the pet absorbent sheet 100 of the first embodiment.

Sixth Embodiment

Figure 8:
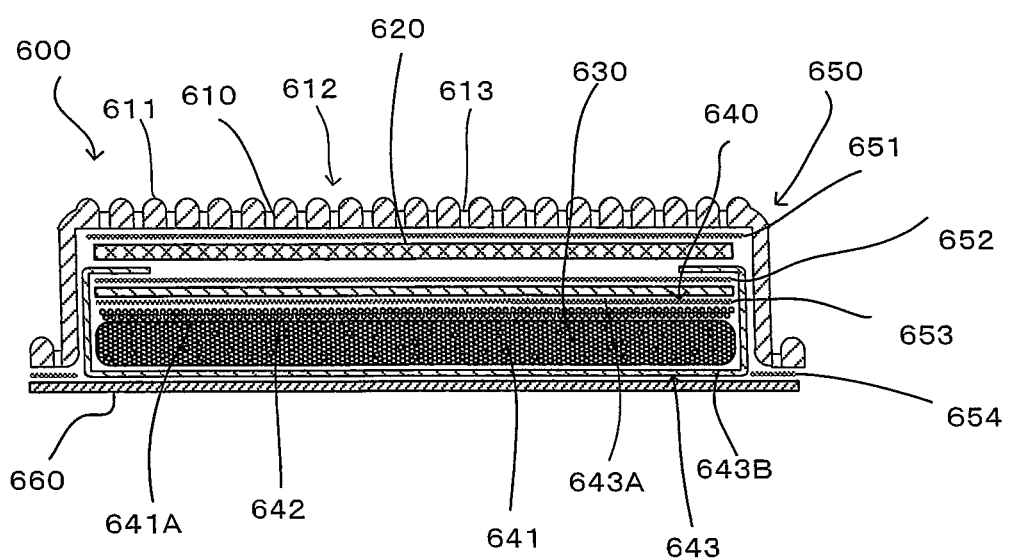
FIG. 8 is a sectional view showing an absorbent sheet for pets according to a sixth embodiment of the present invention.

A sixth embodiment according to the present invention is explained with reference to FIG. 8. In a pet absorbent sheet 600 according to the sixth embodiment, an absorber 640 is disposed between a top sheet 610 and a back sheet 660. Further, an intermediate sheet 620 is disposed between the top sheet 610 and the absorber 640.

The top sheet 610 has the same structure as the top sheet 110 of the first embodiment. Specifically, the top sheet 610 is formed of a through-air nonwoven fabric, having ridges 611, grooves 612 which are each formed between adjacent ones of the ridges 611, and openings 613 which are formed at intervals and extend along the grooves 612.

The back sheet 560 has the same structure as the back sheet 160 of the first embodiment.

In the absorber 640, a core layer 641 and a super absorbent polymer layer 642 which is disposed on a top of the core layer 641 are covered by a first covering sheet 643A and a second covering sheet 643B.

Further, a portion of the second covering sheet 643B which covers part of a core layer top surface 641A is disposed on an excretion surface side of the first covering sheet 643A disposed on the core layer top surface 641A.

The core layer 641 is formed of colored pulp fibers and forms a coloration region 630. This is an example embodiment that corresponds to the feature that "the coloration region is formed in the core layer" according to the present invention.

The first covering sheet 643A and the second covering sheet 643B are formed of uncolored white tissue.

The intermediate sheet 620 has the same structure as the intermediate sheet 120 of the first embodiment.

A surface layer side bonding part 651 has the same structure as the surface layer side bonding part 151 of the first embodiment.

An intermediate bonding part 652 has the same structure as the intermediate bonding part 152 of the first embodiment.

An absorber side bonding part 653 has the same structure as the absorber side bonding part 153 of the first embodiment.

An edge end bonding part 654 has the same structure as the edge end bonding part 154 of the first embodiment.

The pet absorbent sheet 600 according to the sixth embodiment has the same effect as the pet absorbent sheet 100 of the first embodiment.

Seventh Embodiment

Figure 9:
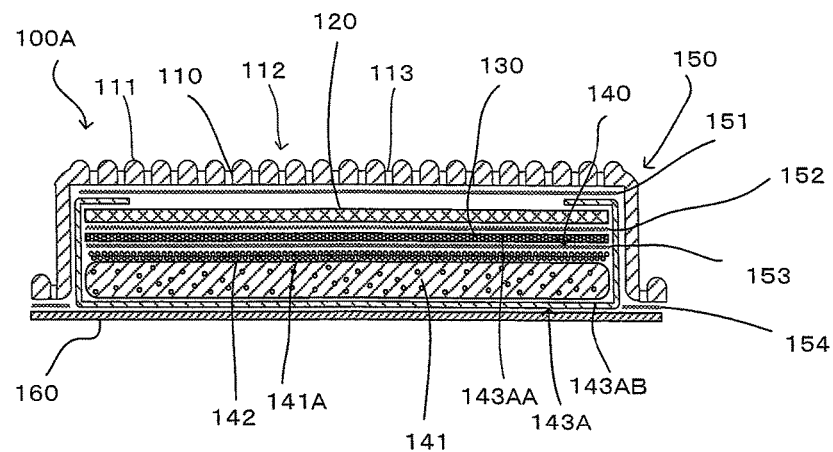
FIG. 9 is a sectional view showing an absorbent sheet for pets according to a seventh embodiment of the present invention.

A seventh embodiment according to the present invention is explained with reference to FIG. 9. A pet absorbent sheet 100A according to the seventh embodiment is different from the pet absorbent sheet 100 of the first embodiment in the arrangement of a second covering sheet 143AB.

Specifically, a portion of the second covering sheet 143AB which covers part of a core layer top surface 141A is disposed on an excretion surface side of the intermediate sheet 120 disposed on the core layer top surface 141A.

The pet absorbent sheet 100A according to the seventh embodiment has the same effect as the pet absorbent sheet 100 according to the first embodiment.

Eighth Embodiment

Figure 10:
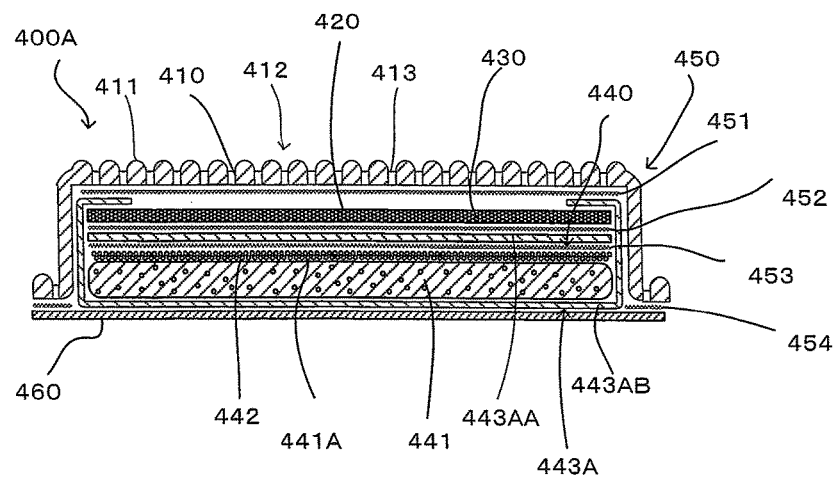
FIG. 10 is a sectional view showing an absorbent sheet for pets according to an eighth embodiment of the present invention.

An eighth embodiment according to the present invention is explained with reference to FIG. 10. A pet absorbent sheet 400A according to the eighth embodiment is different from the pet absorbent sheet 400 of the fourth embodiment in the arrangement of a second covering sheet 443AB.

Specifically, a portion of the second covering sheet 443AB which covers part of a core layer top surface 441A is disposed on an excretion surface side of the intermediate sheet 420 disposed on the core layer top surface 441A.

The pet absorbent sheet 400A according to the eighth embodiment has the same effect as the pet absorbent sheet 400 according to the fourth embodiment.

Ninth Embodiment

Figure 11:
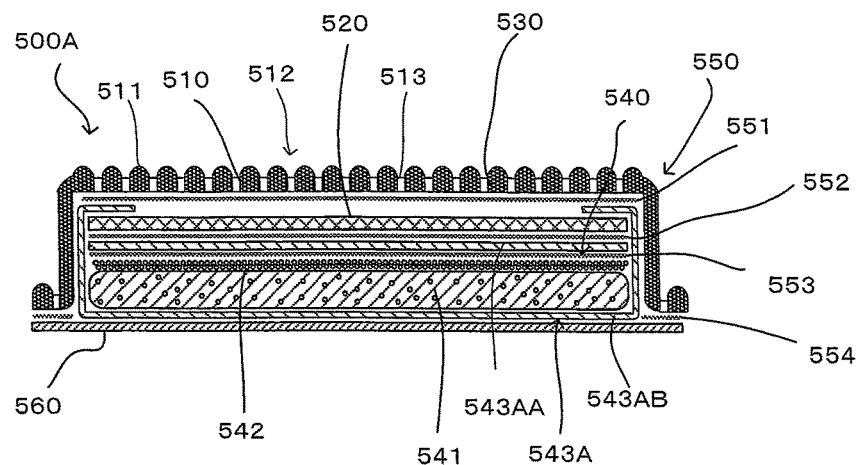
FIG. 11 is a sectional view showing an absorbent sheet for pets according to a ninth embodiment of the present invention.

A ninth embodiment according to the present invention is explained with reference to FIG. 11. A pet absorbent sheet 500A according to the ninth embodiment is different from the pet absorbent sheet 500 of the fifth embodiment in the arrangement of a second covering sheet 543AB.

Specifically, a portion of the second covering sheet 543AB which covers part of a core layer top surface 541A is disposed on an excretion surface side of the intermediate sheet 520 disposed on the core layer top surface 541A.

The pet absorbent sheet 500A according to the ninth embodiment has the same effect as the pet absorbent sheet 500 according to the fifth embodiment.

Tenth Embodiment

Figure 12:
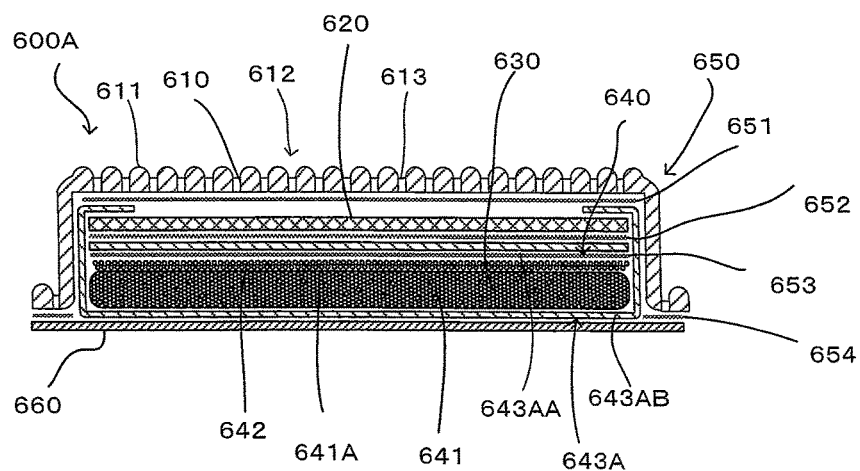
FIG. 12 is a sectional view showing an absorbent sheet for pets according to a tenth embodiment of the present invention.

A tenth embodiment according to the present invention is explained with reference to FIG. 12. A pet absorbent sheet 600A according to the tenth embodiment is different from the pet absorbent sheet 600 according to the sixth embodiment in the arrangement of a second covering sheet 643AB.

Specifically, a portion of the second covering sheet 643AB which covers part of a core layer top surface 641A is disposed on an excretion surface side of the intermediate sheet 620 disposed on the core layer top surface 641A.

The pet absorbent sheet 600A according to the tenth embodiment has the same effect as the pet absorbent sheet 600 according to the sixth embodiment.

Eleventh Embodiment

Figure 13:
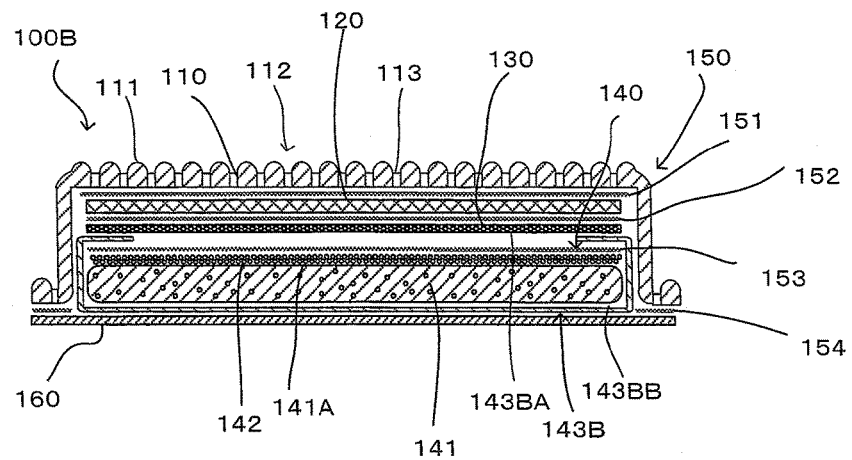
FIG. 13 is a sectional view showing an absorbent sheet for pets according to an eleventh embodiment of the present invention.

An eleventh embodiment according to the present invention is explained with reference to FIG. 13. A pet absorbent sheet 100B according to the eleventh embodiment is different from the pet absorbent sheet 100 of the first embodiment in the arrangement of a second covering sheet 143BB.

Specifically, a portion of the second covering sheet 143BB which covers part of the core layer top surface 141A is disposed on a placing surface side of a first covering sheet 143BA.

The pet absorbent sheet 100B according to the eleventh embodiment has the same effect as the pet absorbent sheet 100 according to the first embodiment.

Twelfth Embodiment

Figure 14:
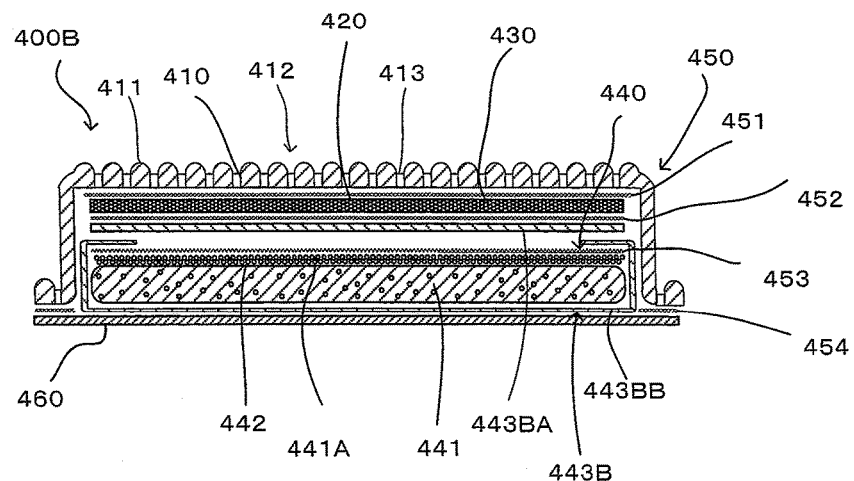
FIG. 14 is a sectional view showing an absorbent sheet for pets according to a twelfth embodiment of the present invention.

A twelfth embodiment according to the present invention is explained with reference to FIG. 14. A pet absorbent sheet 400B according to the twelfth embodiment is different from the pet absorbent sheet 400 of the fourth embodiment in the arrangement of a second covering sheet 443BB.

Specifically, a portion of the second covering sheet 443BB which covers part of a core layer top surface 441A is disposed on a placing surface side of a first covering sheet 443BA.

The pet absorbent sheet 400B according to the twelfth embodiment has the same effect as the pet absorbent sheet 400 according to the fourth embodiment.

Thirteenth Embodiment

Figure 15:
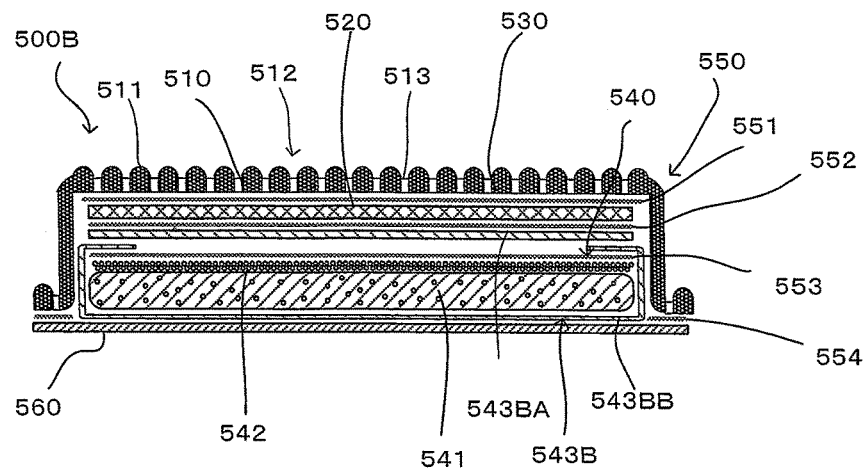
FIG. 15 is a sectional view showing an absorbent sheet for pets according to a thirteenth embodiment of the present invention.

A thirteenth embodiment according to the present invention is explained with reference to FIG. 15. A pet absorbent sheet 500B according to the thirteenth embodiment is different from the pet absorbent sheet 500 of the fifth embodiment in the arrangement of a second covering sheet 543BB.

Specifically, a portion of the second covering sheet 543BB which covers part of a core layer top surface 541A is disposed on a placing surface side of a first covering sheet 543BA.

The pet absorbent sheet 500B according to the thirteenth embodiment has the same effect as the pet absorbent sheet 500 according to the fifth embodiment.

Fourteenth Embodiment

Figure 16:
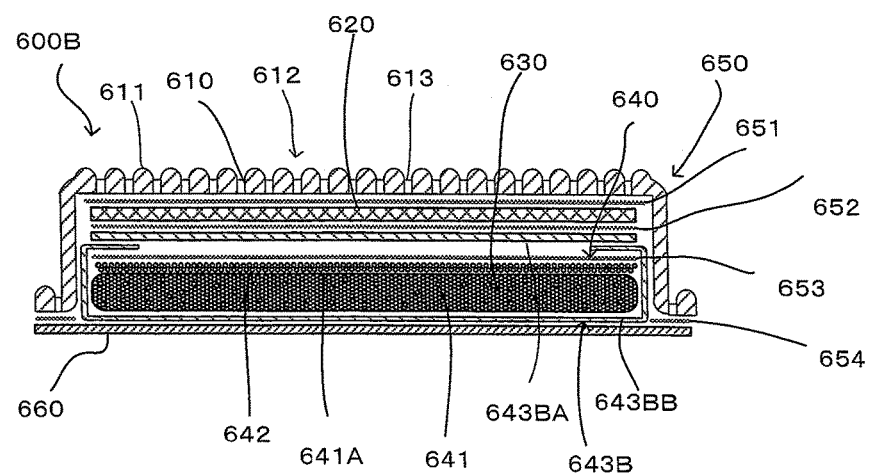
FIG. 16 is a sectional view showing an absorbent sheet for pets according to a fourteenth embodiment of the present invention.

A fourteenth embodiment according to the present invention is explained with reference to FIG. 16. A pet absorbent sheet 600B according to the fourteenth embodiment is different from the pet absorbent sheet 600 of the sixth embodiment in the arrangement of a second covering sheet 643BB.

Specifically, a portion of the second covering sheet 643BB which covers part of a core layer top surface 641A is disposed on a placing surface side of a first covering sheet 643BA.

The pet absorbent sheet 600B according to the fourteenth embodiment has the same effect as the pet absorbent sheet 600 according to the sixth embodiment.

The structure of the absorbent sheet for pets according to the present invention is not limited to those as described above. Further, the structures according to the first to fourteenth embodiments can be appropriately applied in combination.

EXAMPLE

Example according to the present invention is shown in FIGS. 17 and 18.

The Example is used to evaluate the concealability for excrement with respect to the absorbent sheet for pets according to the present invention.

First, in preparing the Example, evaluation of total light transmittance was conducted on sheet-like members for forming the Example and Comparative Example.

For the evaluation, five sheets were obtained.

Sheet 1 is formed of through-air nonwoven fabric and has a basis weight of 25 g/m$^2$.

Sheet 2 is formed of through-air nonwoven fabric and has a basis weight of 23 g/m$^2$.

Sheet 3 is formed of through-air nonwoven fabric and has a basis weight of 20 g/m$^2$.

Sheet 4 is formed of SMS (spunbond/meltblown/spunbond) nonwoven fabric and Sheet 4 is formed of SMS (spunbond/meltblown/spunbond) nonwoven fabric and has a basis weight of 8 g/m$^2$.

Sheet 5 is formed of tissue paper and has a basis weight of 15 g/m$^2$. The tissue paper of sheet 5 is colored by adding black pigment of 1% by weight.

For measurement of the total light transmittance, a test was conducted in accordance with JIS K 7015 by using a turbidimeter Z-300A of Nippon Denshoku Industries Co., Ltd. The test was carried out ten times for one sheet to find an average.

The measurement results are shown in FIG. 17.

Based on the measurement results of the total light transmittance, the sheet-like members were selected to obtain the Example and the Comparative Example.

The Example has the same structure as the pet absorbent sheet 100 of the first embodiment according to the present invention.

Example 1

The through-air nonwoven fabric of sheet 3 is used as the top sheet. The SMS nonwoven fabric of sheet 4 is used as the intermediate sheet. The tissue paper of sheet 5 is used as the covering sheet.

Further, a mixture of pulp having a basis weight of 60 g/m$^2$ and super absorbent polymer is used as the absorber. A resin film sheet is used as the back sheet.

Specifically, in this Example, the top sheet has a lower total light transmittance than the intermediate sheet.

Comparative Example 1

The SMS nonwoven fabric of sheet 4 is used as the top sheet. The through-air nonwoven fabric of sheet 3 is used as the intermediate sheet. As for the covering sheet, the absorber and the back sheet, the same sheets as those in Example 1 are used.

Specifically, in this Comparative Example, the top sheet has a higher total light transmittance than the intermediate sheet.

Next, a test for evaluating the excrement concealing effect was conducted using the absorbent sheets for pets in Example 1 and Comparative Example 1.

For the test, artificial urine is first prepared by adding 0.005 g of yellow pigment No. 5 to 500 ml of common transparent artificial urine.

40 cc of the artificial urine is dropped onto each of the pet absorbent sheets of the Example and the Comparative Example. The Example and the Comparative Example are visually evaluated after an elapse of 10 seconds, 1 minute, 2 minutes and 5 minutes after dropping of the artificial urine.

In the evaluation, the color of the top sheet is rated on a scale of 1 to 10, provided that the color of the top sheet on which the artificial urine is not dropped is 1 and the color of the top sheet immediately after the artificial urine is dropped thereon is 10

FIG. 18 shows the evaluation results.

This data show that the Example according to the present invention has a higher concealability for excrement than the Comparative Example.

(Correspondences Between the Features of the Embodiments and the Features of the Invention)

The pet absorbent sheets 100, 200, 300, 400, 500, 600, 100A, 400A, 500A, 600A, 100B, 400B, 500B, 600B are example embodiments that correspond to the "absorbent sheet for pets" according to the present invention. The excretion surface 101 is an example embodiment that corresponds to the "excretion surface" according to the present invention. The placing surface 102 is an example embodiment that corresponds to the "placing surface" according to the present invention. The top sheets 110, 210, 310, 410, 510, 610 are example embodiments that correspond to the "top sheet" according to the present invention. The back sheets 160, 260, 360, 460, 560, 660 are example embodiments that correspond to the "back sheet" according to the present invention. The absorbers 140, 240, 340, 440, 540, 640 are example embodiments that correspond to the "absorber" according to the present invention. The core layers 141, 241, 341, 441, 541, 641 are example embodiments that correspond to the "core layer" according to the present invention. The core layer top surfaces 141A, 241A, 341A, 441A, 541A, 641A are example embodiments that correspond to the "core layer top surface" according to the present invention. The core layer back surfaces 141B, 241B, 341B, 441B, 541B, 641B are example embodiments that correspond to the "core layer back surface" according to the present invention. The core layer side surfaces 141C, 241C, 341C, 441C, 541C, 641C are example embodiments that correspond to the "core layer side surface" according to the present invention. The covering sheets 143, 243, 343, 443, 543, 643, 143A, 443A, 543A, 643A, 143B, 443B, 543B, 643B are example embodiments that correspond to the "covering sheet" according to the present invention. The intermediate sheets 120, 220, 320, 420, 520, 620 are example embodiments that correspond to the "intermediate sheet" according to the present invention. The coloration regions 130, 230, 330, 430, 530, 630 are example embodiments that correspond to the "coloration region" according to the present invention. The ridges 111, 211, 311, 411, 511, 611 are example embodiments that correspond to the "ridge" according to the present invention. The grooves 112, 212,

312, 412, 512, 612 are example embodiments that correspond to the "groove" according to the present invention. The covering sheets 143, 243, 343, 443, 543, 643, 143A, 443A, 543A, 643A are example embodiments that correspond to the "covering sheet" according to the present invention. The first covering sheets 143A, 243A, 343A, 443A, 543A, 643A, 143AA, 443AA, 543AA, 643AA, 143BA, 443BA, 543BA, 643BA are example embodiments that correspond to the "first covering sheet" according to the present invention. The second covering sheets 143B, 243B, 343B, 443B, 543B, 643B, 143AB, 443AB, 543AB, 643AB, 143BB, 443BB, 543BB, 643BB are example embodiments that correspond to the "second covering sheet" according to the present invention. The third covering sheet 343 is an example embodiment that corresponds to the "third covering sheet" according to the present invention.

In view of the nature of the above-described invention, various features can be provided as follows.

(Aspect 1)

An absorbent sheet for pets, comprising:

an excretion surface on which a pet excretes, a placing surface opposite to the excretion surface, a liquid-permeable top sheet that is disposed on the excretion surface (side), a liquid-impermeable back sheet that is disposed on the placing surface (side), an absorber that is disposed between the top sheet and the back sheet and absorbs liquid which has penetrated the top sheet, a core layer that is provided in the absorber and has a core layer top surface formed on a side of the core layer facing the excretion surface, a core layer back surface formed on a side of the core layer facing the placing surface, and a core layer side surface formed between the core layer top surface and the core layer back surface, a covering sheet that covers at least part of the core layer top surface, and an intermediate sheet that is disposed between the top sheet and the absorber, wherein:

the absorbent sheet has a coloration region that is visible from the excretion surface side and forms a coloration pattern together with other regions of the absorbent sheet, and the top sheet is formed to have a lower total light transmittance than the intermediate sheet.

(Aspect 2)

The absorbent sheet as defined in aspect 1, wherein difference in total light transmittance between the top sheet and the intermediate sheet is 1 to 50%.

(Aspect 3)

The absorbent sheet as defined in aspect 1 or 2, wherein the total light transmittance of the top sheet is 40 to 80%.

(Aspect 4)

The absorbent sheet as defined in any one of aspects 1 to 3, wherein the total light transmittance of the intermediate sheet is 60 to 90%.

(Aspect 5)

The absorbent sheet as defined in any one of aspects 1 to 4, wherein the top sheet has a plurality of ridges and grooves that are each formed between adjacent ones of the ridges.

(Aspect 6)

The absorbent sheet as defined in any one of aspects 1 to 5, wherein the intermediate sheet comprises a composite nonwoven fabric having a meltblown nonwoven fabric layer between two spun-bond nonwoven fabric layers and having a basis weight of 8 to 25 g/m$^2$.

(Aspect 7)

The absorbent sheet as defined in any one of aspects 1 to 6, wherein the coloration region has an L* value of 50 or less in an L*a*b* color system.

(Aspect 8)

The absorbent sheet as defined in any one of aspects 1 to 6, wherein the coloration region has an L* value larger than 0 but smaller than 100 and a b* value larger than −0.4a in an L*a*b* color system.

(Aspect 9)

The absorbent sheet as defined in any one of aspects 1 to 8, wherein the coloration region is formed in the covering sheet.

(Aspect 10)

The absorbent sheet as defined in aspect 9, wherein the covering sheet comprises a first covering sheet that covers at least part of the core layer top surface and a second covering sheet that covers at least part of the core layer back surface, and the coloration region is formed in the first covering sheet.

(Aspect 11)

The absorbent sheet as defined in aspect 9, wherein the covering sheet comprises a third covering sheet that covers the core layer back surface and the coloration region is formed in the third covering sheet.

(Aspect 12)

The absorbent sheet as defined in any one of aspects 9 to 11, wherein a plurality of the intermediate sheets are provided.

(Aspect 13)

The absorbent sheet as defined in any one of aspects 1 to 8, wherein the coloration region is formed in the intermediate sheet.

(Aspect 14)

The absorbent sheet as defined in any one of aspects 1 to 8, wherein the coloration region is formed in the top sheet.

(Aspect 15)

The absorbent sheet as defined in any one of aspects 1 to 8, wherein the coloration region is formed in the core layer.

DESCRIPTION OF THE NUMERALS

100, 200, 300, 400, 500, 600, 100A, 400A, 500A, 600A, 100B, 400B, 500B, 600B pet absorbent sheet (absorbent sheet for pets)
101 excretion surface
102 placing surface
110, 210, 310, 410, 510, 610 top sheet
111, 211, 311, 411, 511, 611 ridge
112, 212, 312, 412, 512, 612 groove
113, 213, 313, 413, 513, 613 opening
120, 220, 320 420, 520, 620 intermediate sheet
221 first intermediate sheet
222 second intermediate sheet
130, 230, 330, 430, 530, 630 coloration region
140, 240, 340, 440, 540, 640 absorber
141, 241, 341, 441, 541, 641 core layer
141A, 241A, 341A, 441A, 541A, 641A core layer top surface
141B, 241B, 341B, 441B, 541B, 641B core layer back surface
141C, 241C, 341C, 441C, 541C, 641C core layer side surface
142, 242, 342, 442, 542, 642 super absorbent polymer layer
143, 243, 343, 443, 543, 643, 143A, 443A, 543A, 643A, 143B, 443B, 543B, 643B covering sheet 143A, 243A, 343A, 443A, 543A, 643A, 143AA, 443AA, 543AA, 643AA, 143BA, 443BA, 543BA, 643BA first covering sheet
143B, 243B, 343B, 443B, 543B, 643B, 143AB, 443AB, 543AB, 643AB, 143BB, 443BB, 543BB, 643BB second covering sheet
343 third covering sheet
150, 250, 350, 450, 550, 650 bonding part
151, 251, 351, 451, 551, 651 surface layer side bonding part
152, 252, 352, 452, 552, 652 intermediate bonding part
153, 253, 353, 453, 553, 653 absorber side bonding part
154, 254, 354, 454, 554, 654 edge end bonding part
252A first intermediate bonding part
252B second intermediate bonding part
160, 260, 360, 460, 560, 660 back sheet

The invention claimed is:

1. An absorbent sheet for pets comprising:
an excretion surface on which a pet excretes,
a placing surface that is opposite to the excretion surface,
a liquid-permeable top sheet that is disposed on the excretion surface side,
a liquid-impermeable back sheet that is disposed on the placing surface side,
an absorber that includes a core layer that comprises pulp, said absorber being disposed between the top sheet and the back sheet and absorbs liquid which has penetrated the top sheet,
the core layer including:
 a core layer top surface formed on a side of the core layer facing the excretion surface,
 a core layer back surface formed on a side of the core layer facing the placing surface, and
 a core layer side surface between the core layer top surface and the core layer back surface,
a covering sheet that covers at least part of the core layer top surface, and
an intermediate sheet, wherein:
the covering sheet comprises a first covering sheet and a second covering sheet, and the intermediate sheet is disposed between the top sheet and the first covering sheet,
the first covering sheet covers a top of the core layer top surface,
the second covering sheet that covers the core layer back surface, the core layer side surface and part of the core layer top surface,
a coloration region being visible from the excretion surface side of the absorbent sheet and forms a coloration pattern together with other regions of the absorbent sheet,
the top sheet is formed to have a lower total light transmittance than the intermediate sheet,
the intermediate sheet comprises a composite nonwoven fabric having a meltblown nonwoven fabric layer between two spun-bond nonwoven fabric layers and having a basis weight of 8 to 25 g/m$^2$,
the top sheet has a plurality of ridges and grooves that are each formed between adjacent ones of the ridges, and
a peripheral edge of the top sheet and a peripheral edge of the back sheet are bonded together.

2. The absorbent sheet as defined in claim 1, wherein difference in total light transmittance between the top sheet and the intermediate sheet is 1 to 50%.

3. The absorbent sheet as defined in claim 1, wherein the total light transmittance of the top sheet is 40 to 80%.

4. The absorbent sheet as defined in claim 1, wherein the total light transmittance of the intermediate sheet is 60 to 90%.

5. The absorbent sheet as defined in claim 1, wherein the coloration region has a brightness value (L*) of 50 or less in an L*a*b color system.

6. The absorbent sheet as defined in claim 1, wherein the coloration region has an L* value larger than 0 but smaller than 100 and a blue-yellow component (b*) value larger than a green-red component (a*) of −0.4 in an L*a*b* color system.

7. The absorbent sheet as defined in claim 1, wherein the covering sheet is a single covering sheet that covers the core layer back surface and the coloration region is formed in the single covering sheet, and the intermediate sheet is disposed between the top sheet and the single covering sheet.

8. The absorbent sheet as defined in claim 1, wherein a plurality of the intermediate sheets are provided.

9. The absorbent sheet as defined in claim 1, wherein the coloration region is formed in the intermediate sheet.

10. The absorbent sheet as defined in claim 1, wherein the coloration region is formed in the top sheet.

11. The absorbent sheet as defined in claim 1, wherein the coloration region is formed in the core layer.

12. The absorbent sheet as defined in claim 1, wherein the coloration region that is formed in the first covering sheet.

* * * * *